United States Patent
Leroux

(10) Patent No.: US 11,228,357 B2
(45) Date of Patent: Jan. 18, 2022

(54) TRANSMISSIONS BETWEEN A BASEBAND UNIT AND A RADIO UNIT OF TRANSFORMED SIGNALS IN A BEAM SPACE

(71) Applicant: Philippe Leroux, Ottawa (CA)

(72) Inventor: Philippe Leroux, Ottawa (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/978,116

(22) PCT Filed: Mar. 7, 2018

(86) PCT No.: PCT/IB2018/051485
§ 371 (c)(1),
(2) Date: Sep. 3, 2020

(87) PCT Pub. No.: WO2019/171141
PCT Pub. Date: Sep. 12, 2019

(65) Prior Publication Data
US 2021/0013945 A1 Jan. 14, 2021

(51) Int. Cl.
*H04B 7/06* (2006.01)
*H04B 7/0456* (2017.01)
*H04J 11/00* (2006.01)
*H04L 25/02* (2006.01)
*H04W 88/08* (2009.01)

(52) U.S. Cl.
CPC ......... *H04B 7/0689* (2013.01); *H04B 7/0486* (2013.01); *H04J 11/0036* (2013.01); *H04L 25/0202* (2013.01); *H04W 88/085* (2013.01)

(58) Field of Classification Search
CPC .. H04B 7/0802; H04B 7/0486; H04B 7/0617; H04B 7/0689; H04B 7/088; H04L 5/0007; H04L 5/0023; H04L 25/0202; H04L 5/0035; H04L 5/0048; H04L 5/1461; H04J 11/0036
See application file for complete search history.

(56) References Cited

U.S. PATENT DOCUMENTS

| | | | |
|---|---|---|---|
| 2008/0049658 A1 | 2/2008 | Asai et al. | |
| 2008/0317104 A1 | 12/2008 | Akcaba et al. | |
| 2016/0315674 A1* | 10/2016 | Li | H04B 7/0413 |
| 2017/0331577 A1* | 11/2017 | Parkvall | H04W 8/18 |
| 2019/0020393 A1* | 1/2019 | Yuan | H04B 7/0473 |
| 2020/0389880 A1* | 12/2020 | Lu | H04B 7/0617 |
| 2021/0021446 A1* | 1/2021 | Shiki | H04J 11/00 |

OTHER PUBLICATIONS

International Search Report for PCT/IB2018/051485, dated Jan. 14, 2020; 22 pages.

\* cited by examiner

*Primary Examiner* — Khanh C Tran
(74) *Attorney, Agent, or Firm* — Ericsson Canada Inc.; Haizhen Jin

(57) ABSTRACT

There is provided a method for exchanging spatial information of signals received from a User Equipment (UE) between a radio unit and a baseband unit. The method comprises: determining a channel estimate based on signals received from a User Equipment (UE); selecting a spatial transformation to be applied to the received signals, based on the channel estimate; and sending a set of signals transformed by the selected transformation to a baseband unit. A radio unit for implementing this method is also provided.

19 Claims, 7 Drawing Sheets

TRANSMISSIONS BETWEEN A BASEBAND UNIT AND A RADIO UNIT OF TRANSFORMED SIGNALS IN A BEAM SPACE

TECHNICAL FIELD

The present description generally relates to communications in a wireless communication network, and more particularly to an advanced signal coordination technique/protocol in a beam space and transmissions of such signals between a baseband unit and a radio unit.

BACKGROUND

Compared to the fourth generation (4G), the fifth generation (5G) cellular standard aims to improve the spectral efficiency by 3-10 times and data rates by 50 times to serve the escalating growth of connected devices. To achieve these goals, some key enabling technologies include massive Multiple Input Multiple Output (MIMO) systems, support of heterogenous networks with wireless backhaul and full-duplex transmission and active antenna system (AAS). A typical application of AAS is to perform Multi-User (MU)-MIMO which allows the frequency resources to be shared by multiple User Equipments (UEs) with co-scheduling transmissions at the same time. As a result, the co-scheduled UEs suffer from the co-channel interference, which is one of the biggest challenges for MU-MIMO systems. One of the approaches to address this challenge is to do codebook-based MU-MIMO, which tries to pair UEs with good spatial separation. For example, the base station (eNB/gNB) uses an UE pairing algorithm to find the UEs which are well-separated from each other and thus can be co-scheduled with minimized co-channel interference.

A typical wireless base station consists of a baseband processing unit (BBU) and a Radio Frequency (RF) processing unit (e.g. a remote radio unit (RRU) or radio unit (RU)). The BBU can be placed in the equipment room, for example, and is connected to the RRU via a communication link, such as an optical fiber, ethernet or other links. The RRU can communicate with a User Equipment (UE) through an air interface.

The Radio unit (RU) receives the signals from the UE, converts them to a baseband frequency, digitizes them, and forwards them to the Baseband unit (BBU) for processing (demodulation, channel estimation, etc.). Similarly, in downlink (DL), the BBU forwards modulated signals in baseband frequency to the RU which processes them and then sends them over the air to the UE. With the Advanced antenna systems (AAS), the RU may take upon more processing than a simple frequency and digital conversion. For instance, the Radio unit (RU) may receive signals from the UEs, then, the RU may convert the signals from an antenna space to a beam space by using a Fast Fourier Transform (FFT). The RU then sends the spatial information of the signals (e.g. beams) as determined by the FFT to the BBU.

In order to save some bandwidth, the radio unit can reduce the amount of spatial information to be sent to the BBU by selecting the n best beams, with n being a fixed value. This reduced amount of information is sent to the BBU over an interface defined between the BBU and the RU.

The received spatial information is used by the BBU to decide on beamforming strategies and scheduling such as pairing users/UEs for Multi-User (MU) MIMO transmissions and/or selecting beams for one or more layers for a UE.

SUMMARY

One of the problems with the current systems is as follows:

In the current systems, the amount of data and the type of data transmitted to the BBU for making decisions on beamforming and scheduling strategies are fixed for all the UEs. As such, the current systems do not support easily increasing the antenna array and number of UEs within the constraints of the BBU to RU link/interface characteristics.

In a first aspect, a method in a radio unit (RU) is provided. Embodiments of the method according to the first aspect comprise the steps of: determining a channel estimate based on signals received from a User Equipment (UE); selecting a spatial transformation to be applied to the received signals, based on the channel estimate; and sending a set of signals transformed by the selected transformation to a baseband unit.

In a second aspect, a method in a baseband unit (BBU) is provided. Embodiments of the method according to the second aspect comprise the steps of: receiving, from a radio unit, a set of signals from a User Equipment (UE) transformed by a transformation selected by a radio unit and an indication of cross-interference information between signals from the UE and signals from other UEs; and determining a resource allocation for transmitting data to the UE, based at least on one of the received set of transformed signals, and the cross-interference information.

According to other aspects, a radio unit (RU) and a baseband unit comprising respective processing circuitry are provided. The circuitry may include one or more processors and memory. The radio unit and baseband unit are operable to perform steps according to embodiments of methods disclosed herein, according to the various aspects.

According to further aspects, computer programs, computer readable media configured to process and/or store instructions for steps according to embodiments of methods disclosed herein, according to the various aspects, are also provided.

Certain embodiments of aspects of the present disclosure may provide one or more technical advantages, including:
  Optimization of the interface between the BBU and RU by reducing the quantity of information being transferred from the RU to BBU. With the need of transferring beam information per resource block (RB) or per subcarrier group (SCG) for many users (for MIMO purposes), the amount of (control) information transmitted over the interface between the BBU and RU could rapidly exceed the capacity of the interface. This interface is less expensive than an existing interface, referred to as C1, which could be a Common Public Radio Interface (CPRI), and which requires transmitting all the radio signals from the RU to the BBU.
  Optimization of the usage of MIMO channels.
  Balancing loads between the RU and BBU.
  In some embodiments, the radio unit and baseband unit may comprise one or more functional modules configured to perform one or more functionalities of the RU or BBU, respectively, as described herein.

According to another aspect, some embodiments include a non-transitory computer-readable medium storing a computer program product comprising instructions which, upon being executed by processing circuitry (e.g., at least one processor) of the radio unit and baseband unit, configure the processing circuitry to perform one or more functionalities or the RU or BBU, as described herein.

This summary is not an extensive overview of all contemplated embodiments and is not intended to identify key or critical aspects or features of any or all embodiments or to delineate the scope of any or all embodiments. In that sense, other aspects and features will become apparent to those ordinarily skilled in the art upon review of the following description of specific embodiments in conjunction with the accompanying figures.

BRIEF DESCRIPTION OF THE DRAWINGS

Exemplary embodiments will be described in more detail with reference to the following figures, in which.

DETAILED DESCRIPTION

The embodiments set forth below represent information to enable those skilled in the art to practice the embodiments. Upon reading the following description in light of the accompanying figures, those skilled in the art will understand the concepts of the description and will recognize applications of these concepts not particularly addressed herein. It should be understood that these concepts and applications fall within the scope of the description.

In the following description, numerous specific details are set forth. However, it is understood that embodiments may be practiced without these specific details. In other instances, well-known circuits, structures, and techniques have not been shown in detail in order not to obscure the understanding of the description. Those of ordinary skill in the art, with the included description, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

As used herein, the singular forms "a", "an" and "the" are intended to include the plural forms as well, unless the context clearly indicates otherwise. It will be further understood that the terms "comprises," "comprising," "includes," and/or "including" when used herein, specify the presence of stated features, integers, steps, operations, elements, and/or components, but do not preclude the presence or addition of one or more other features, integers, steps, operations, elements, components, and/or groups thereof.

Figure 1:
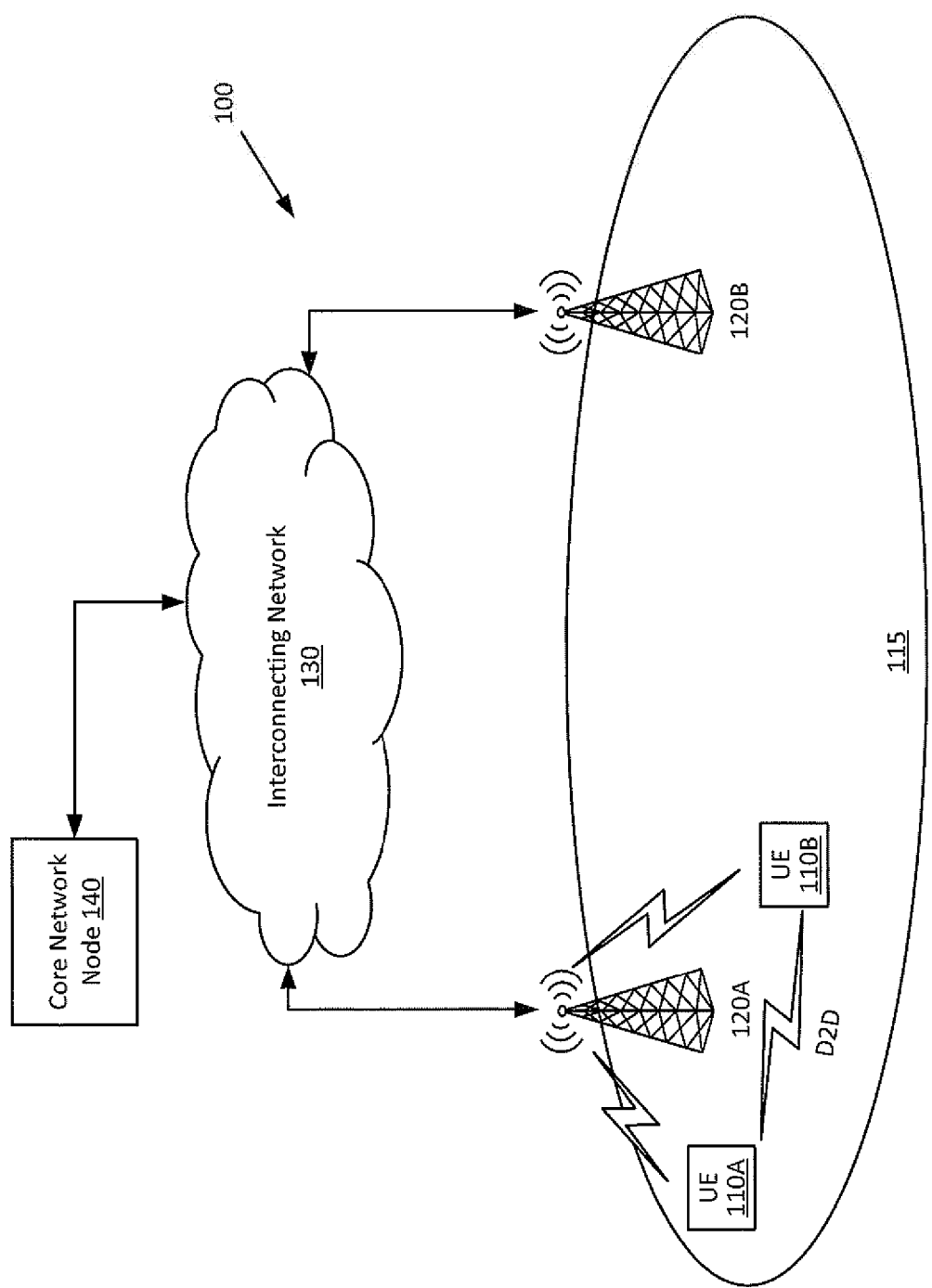
FIG. 1 illustrates a schematic diagram of a communication network.

FIG. 1 illustrates an example of a wireless communication network 100 that may be used for wireless communications. Wireless communication network 100 includes wireless devices 110 (e.g., user equipments, UEs) and a plurality of network nodes 120 (e.g., eNBs, gNBs, base stations, etc.) connected to one or more core network nodes 10 via an interconnecting network 130. Wireless devices 110 within a coverage area may each be capable of communicating directly with network nodes 120 over a wireless interface. In certain embodiments, wireless devices 110 may also be capable of communicating with each other via device-to-device (D2D) communication. In certain embodiments, network nodes 120 may also be capable of communicating with each other, e.g. via an interface (e.g. X2 in LTE or other suitable interface).

As an example, wireless device 110 may communicate with network node 120 over a wireless interface. That is, wireless device 110 may transmit wireless signals and/or receive wireless signals from network node 120. The wireless signals may contain voice traffic, data traffic, control signals, and/or any other suitable information. In some embodiments, an area of wireless signal coverage associated with a network node 120 may be referred to as a cell.

In some embodiments wireless device 110 may be interchangeably referred to by the non-limiting term user equipment (UE). Wireless device 110 can be any type of wireless device capable of communicating with network node or another UE over radio signals. The UE may also be a radio communication device, target device, device to device (D2D) UE, machine type UE or UE capable of machine to machine communication (M2M), a sensor equipped with UE, iPAD, Tablet, mobile terminals, smart phone, laptop embedded equipped (LEE), laptop mounted equipment (LME), USB dongles, Customer Premises Equipment (CPE), etc.

In some embodiments, the "network node" can be any kind of network node which may comprise of a radio network node such as a radio access node (which can include a base station, radio base station, base transceiver station, base station controller, network controller, gNB, NR BS, evolved Node B (eNB), Node B, Multi-cell/multicast Coordination Entity (MCE), relay node, access point, radio access point, Remote Radio Unit (RRU), Remote Radio Head (RRH), a multi-standard BS (also known as MSR BS), etc.), a core network node (e.g., MME, SON node, a coordinating node, positioning node, MDT node, etc.), or even an external node (e.g., 3rd party node, a node external to the current network), etc. The network node may also comprise a test equipment.

In certain embodiments, network nodes 120 may interface with a radio network controller (not shown). The radio network controller may control network nodes 120 and may provide certain radio resource management functions, mobility management functions, and/or other suitable functions. In certain embodiments, the functions of the radio network controller may be included in the network node 120. The radio network controller may interface with the core network node 140. In certain embodiments, the radio network controller may interface with the core network node 140 via the interconnecting network 130.

The interconnecting network 130 may refer to any interconnecting system capable of transmitting audio, video, signals, data, messages, or any combination of the preceding. The interconnecting network 130 may include all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, or any other suitable communication link, including combinations thereof.

In some embodiments, the core network node 140 may manage the establishment of communication sessions and various other functionalities for wireless devices 110. Examples of core network node 140 may include MSC, MME, SGW, PGW, O&M, OSS, SON, positioning node (e.g. E-SMLC), MDT node, etc. Wireless devices 110 may exchange certain signals with the core network node 140 using the non-access stratum layer. In non-access stratum signaling, signals between wireless devices 110 and the core network node 140 may be transparently passed through the radio access network. In certain embodiments, network nodes 120 may interface with one or more other network nodes over an internode interface. For example, network nodes 120 may interface each other over an X2 interface.

Although FIG. 1 illustrates a particular arrangement of network 100, the present disclosure contemplates that the various embodiments described herein may be applied to a variety of networks having any suitable configuration. For example, network 100 may include any suitable number of wireless devices 110 and network nodes 120, as well as any additional elements suitable to support communication between wireless devices or between a wireless device and another communication device (such as a landline telephone). The embodiments may be implemented in any appropriate type of telecommunication system supporting any suitable communication standards and using any suitable components and are applicable to any radio access technology (RAT) or multi-RAT systems in which the wireless device receives and/or transmits signals (e.g., data).

Now turning to FIG. 2, a more detailed illustration of the network node 120 will be described.

For example, the network node 120 can comprise a baseband unit (BBU) 200 and a Radio unit (RU) 210, the BBU being connected to the RU through an interface 220. The interface 220 could be a Common Public Radio Interface (CPRI) or ethernet or an optical link or any other kinds of interfaces used for data transmission between the BBU 200 and the RU 210.

Figure 2:
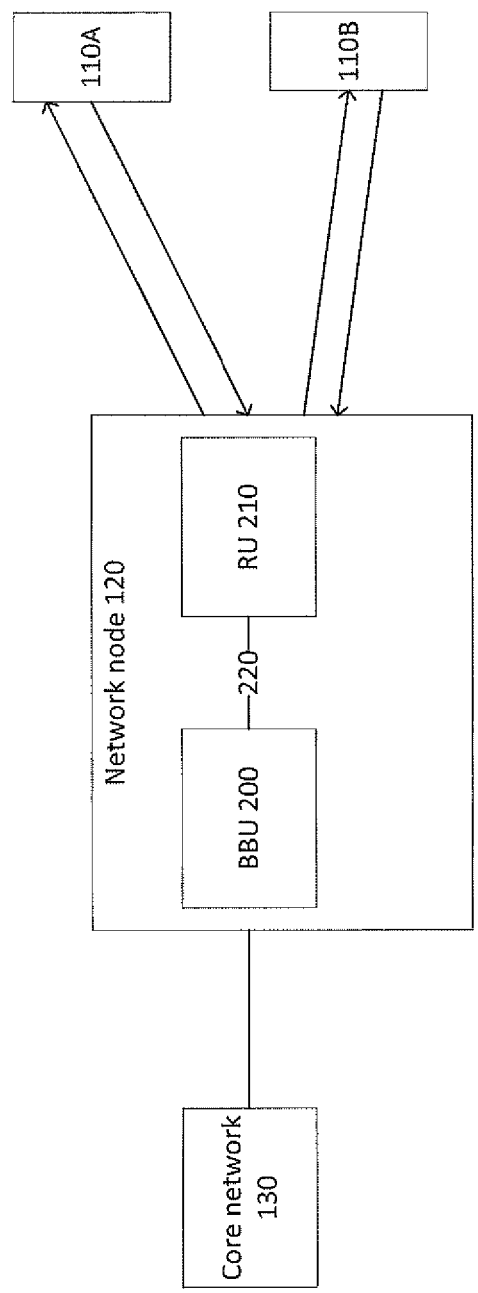
FIG. 2 illustrates a schematic diagram of a network node comprising a radio unit and baseband unit.

The network node 120 can be connected to the core network 130 and UEs 110A and 110B as shown in FIGS. 1 and 2.

The RU 210 receives the signals from the UEs 110, through an array of antennas, for example. It determines the channel information/estimate from the received signals. Then, the RU 210 converts the received signals from the antenna space (power/phase) to a beam space by performing a default and fixed transformation. As a result of the conversion/transformation, the RU 210 obtains a plurality of signals in the beam space. Then, in order to reduce the amount of spatial information (e.g. beams) that needs to be transmitted to the BBU 200, the RU 210 can select n best beams from a plurality of beams. Finally, the RU 210 sends the n beams, as the spatial information, to the BBU 200 over the interface 220.

Once the BBU 200 receives the spatial information, the BBU 200 can determine beamforming and scheduling strategies based on the spatial information. The beamforming and scheduling strategies may comprise pairing UEs for MU-MIMO transmissions and/or selecting beams for one or more layers for a UE, for example.

One of the problems with the current systems is that the amount of data and the type of data transmitted to the BBU to make decisions on the beamforming strategies (SU/MU MIMO, multilayer) are fixed for all UEs and do not scale or adjust to each of the UEs' channels' characteristics.

Generally stated, embodiments of this disclosure provide a RU 210 that can dynamically select a spatial transformation that is used to generate spatial and frequency properties of the RU-UE channel and signals received from the UEs. The selected transformation allows to change the referential of the signals from a first antenna referential to a second referential. The UE signals are then sent to the BBU 200, as transformed in the selected spatial referential, to inform the BBU 200 about the spatial and frequency properties of the UEs' channels and signals.

The RU 210 can for example choose for a first UE to use an Eigen vector decomposition (or singular value decomposition (SVD)) as the spatial transformation to apply to the UE signals. The spatial transformation could be chosen based on any optimization calculation criterion such as Minimum Mean Square Error (MMSE), Zero-Forcing, Interference-rejection and cancelation, etc.

Notably, the spatial transformation is chosen in such a way as to select a spatial referential, to represent the signals of a UE or a set of UEs, that maximizes the signal information in the fewest dimensions.

This selection process can be done by taking into account interference measurements between UEs, UE-co-interference or orthogonality (of the signals) factors, for example. The selected spatial referential should also respect a constraint of the interface 220 which limits the capacity or bandwidth for signal transmissions between the BBU and RU.

Once the signals are transformed, those signals are expressed in a beam space, e.g. one beam as being one dimension of the signals expressed in the beam space. The RU 210 can send the signals expressed in the beam space given by the selected transformation, to the BBU 200 without having to inform the BBU 200 of the choice of the referential/transformation that was used. In other words, the signals transformed by the selected transformation are sent to the BBU 200. Optionally, the RU 210 could send the selected transformation to the BBU 200.

For another UE, the RU 210 can decide to choose another transformation that is different from the transformation of the first UE. Therefore, the signals of this UE are expressed in another referential. The choice of the different transformations can be based on the characteristics of the channel for each UE.

Also, for MU cases, the RU 210 could select a joint referential for a plurality of UEs that have strong capability of being paired, for example. It could also select one joint referential for all the UEs in the plurality of UEs or subsets of UEs or separate referentials for each UE. But in each case, the RU 210 will also determine the cross-interference information for the UEs using different referentials. This flexibility of referential choices allows the RU 210 to send a smaller amount of information to the BBU 200 and as such the bandwidth of the interface 220 between the RUs and BBUs can be optimized.

As a note, the cross-interference information between signals from UE 110A and signals from UE 110B is defined as follows. When UE 110A and UE 110B transmit a signal on the same frequency and time to the RU 210, the signal coming from UE 110A is seen as interference for the signal received by the RU 210 from UE 110B. Similarly, the signal coming from UE 110B is seen as interference for the signal received by the RU 210 from UE 110A. This is the case specially when the signals from UE 110A and 110B are not orthogonal to each other.

In some embodiments, the RU 210 may decide to use the same transformation for two highly correlated UEs. Then, the RU sends to the BBU 200, the signals of each UE corresponding to the dimensions of the beam space given by the selected transformation. The RU 210 can further inform the BBU 200 that these UEs use the same referential. As such, the BBU may estimate the cross-interference information between signals from these UEs knowing that their respective signals are expressed in the same referential.

Alternatively, the RU 210 may decide to use two different transformations with different dimensions for two highly orthogonal UEs. The RU 210 sends to the BBU 200, the signals of each UE expressed in their respective referential given by the different transformations. The RU 210 further determines the cross-interference information between the signals from these 2 UEs. The cross-interference information can be determined for each transformation. Then, the cross-interference information for each transformation is transmitted to the BBU 200. In all the cases, the BBU 200 does not need to know the selected respective transformation. It is only informed of which UEs use the same referential and which UEs use different referentials/transformations.

Accordingly, the interface 220 can be a less expensive interface than the existing interface C1, which requires all the digitized modulated radio signals to be transmitted to the baseband unit. The interface 220 therefore scales more easily to higher dimensional, multi-antenna/massive-MIMO and multi-user (MU) deployments.

Figure 3:
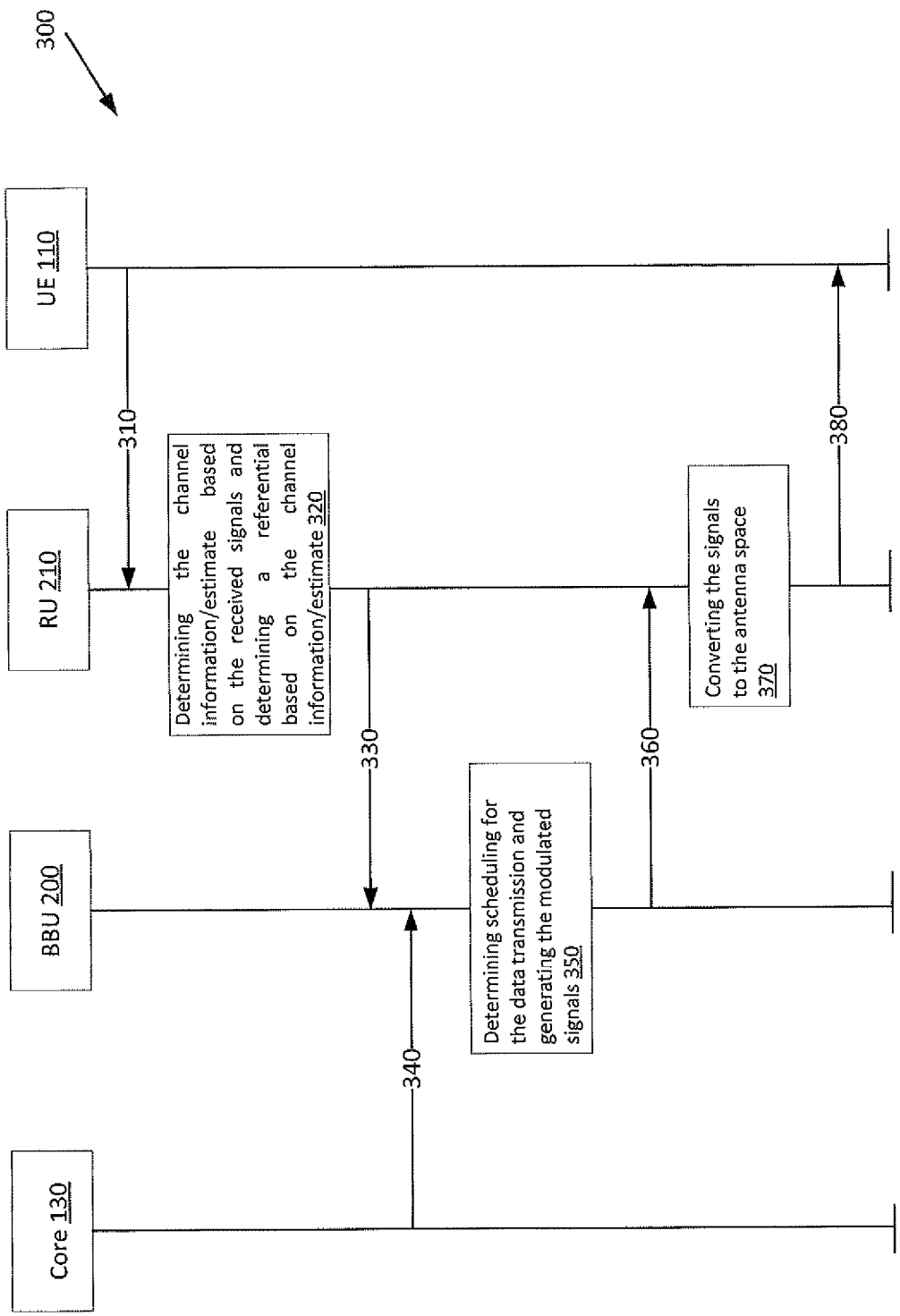
FIG. 3 illustrates a signal diagram of the communications between different elements of a communication network.

FIG. 3 illustrates a signal flow 300 for the communications between the different elements of the network 100, such as the core network 130, the BBU 200, the RU 210, and the UE 110.

In step 310, the UE 110 sends signals to the RU 210, over the air interface. The signals could be Synchronization Reference Signals (SRS), Demodulation Reference Signals (DMRS), random access signals, etc.

In step 320, upon receiving the uplink signals from the UE 110, the RU 210 can determine the channel information or channel estimate from the received signals. Alternatively, the RU 210 can determine the channel information from a Channel Quality Indicator/Channel State Information (CQI/CSI) feedback from the UE's downlink measurements. The RU 210 could also evaluate the channel information based on known and expected UE transmissions, such as Radio Resource Control (RRC) messaging or Random Access Channel (RACH) signaling.

Then, the RU 210 determines a referential on which to project (or transform) the received signals, based on the determined channel estimate. The determined transformation results in a beam space with a reduced number of dimensions for indicating the signal information, as compared to a default transformation (used in current systems). The determined transformation allows to maximize the signal information and minimize redundancy.

To do so, the RU 210 could first analyze the spatial and frequency characteristics of the channel information/estimate. For example, the RU 210 could estimate that the rank of the matrix of the channel information is low, due to the fact that the UE has few antennas, for example. In such a case, the RU 210 could decide to perform a Singular-Value Decomposition (SVD) for transforming the received signals into a beam space. As such, the SVD provides the reduced number of dimensions and maximizes the signal information. As a result of the SVD, the RU 210 can store the eigen vectors as the new referential to use for this UE, and then send the signals transformed into this beam space to the BBU 200. It should be noted that the selection process may take into account one or more of the following elements: one or more UE's channel state (or characteristics), one or more UE's CQI feedback and rank estimation, the bandwidth of the interface 220 and the current traffic load. For example, the RU 210 may, despite knowing that the UEs can report a full Rank 2 transformation, still decide to choose a rank 1 transformation (n=1 which yields a beam reduction) because the RU 210 estimates that pairing UEs for MU-MIMO transmissions will provide more orthogonality than using a rank 2 transformation per UE. As another example, if the traffic of many individual UEs requires more resources/bandwidth over the interface 220, then, the RU 210 may choose a transformation that compresses more the signals.

In some embodiments, the transformation selection process is done by the RU 210 by performing a plurality of predefined transformations on the received signals and then selecting the transformation that provides the most signal information in the fewest numbers of dimensions, among the plurality of transformations. Then, the RU 210 can send the signals expressed in the beam space given by the selected transformation to the BBU 200. If the selected transformation is non-orthogonal, the RU 210 may inform the BBU 200 of this non-orthogonality by transmitting to the BBU 200 some cross-correlation or cross-interference information, for example.

The predefined transformations may include: Zero Forcing (setting zeros in directions of other UEs or interferers such as other RUs), Fast Fourier Transform (FFT), SVD, Discrete Fourier Transform (DFT), shifted DFT, Grassmannian, other oversampled or non-orthogonal transformations, and predefined-codebooks or combinations of transformations. As well, the transformations may include interference-refection techniques.

In some embodiments, the RU 210 may determine the referential or transformation based on time information, spatial location information or frequency information.

For example, a RU 210 that covers (or serves) an area of a cell may record that, after a number of connections to UEs, a certain transformation or a certain referential is most often used or most efficient over time. As such, the RU 210 may consider this transformation first for transforming the received signals. Therefore, the computation load may be reduced by skipping performing a plurality of transformations.

Optionally, the RU 210 can also aggregate selected transformations over a period of time to define a subset of transformations to use. As such, instead of performing every transformation in the plurality of transformations, the RU 210 can only perform the subset of transformations and select one transformation to use from that subset. Therefore, the complexity of the selection process over time can be reduced. The selection of the subset of transformations can be determined by using machine learning, for example. Other learning methods may be considered as well.

The output of the machine learning algorithm for learning the selection of the transformations can also train in time a neural network that, given the inputs (channel estimations of UEs), will automatically determine which transformation to use, thus avoiding, or minimizing the computational cost of the initial transformation selection process (e.g. performing a plurality of transformations and selecting one of the transformations).

In some embodiments, the RU 210 could use a clustering algorithm to approximate a subset of previously used referentials/transformations. The clustering algorithm can provide a transformation that will approximate the transformations in a subset, while minimizing the information loss due to the approximation. As such, the computing cost of the transformation selection process is reduced and the selection process can be simplified over time.

In some embodiments, the RU 210 may determine the referential or transformation based on a position (or location area) of the UE. For example, the RU 210 may record that a certain transformation is most often selected for certain positions of the UE (or areas in which the UE is located). As such, the RU may choose this transformation first, after determining that the UE is located at those positions/areas.

In some embodiments, the RU 210 may determine specific referentials or transformations for different frequency sub-bands. For example, the RU 210 can select a first transformation or referential for a first frequency sub-band (or subsets of Resource Blocks (RBs)) and select a second transformation or referential for a second frequency sub-band.

More specifically, the spatial domain evaluation can be evaluated on different sub-bands.

Currently, either a full bandwidth of the spatial information is evaluated, or a finer grain per SCG evaluation is considered. Typically, the channel changes over the bandwidth with some possibly sharp variations. This means that large contiguous sets of RBs can use the same referential/transformation, while other sets could benefit from a different referential.

As such, the RU 210 could inform BBU 200 of intervals of RBs associated with the same selected beam spaces, e.g.:
RBs {1-15}⇒beam space {A, B, C}, which means that RBs 1 to 15 use beam space A (i.e. a label for the beam space A, in other words, the RU may not send the complete definition of it) for UE 110 A, beam space B for UE 110B, and beam space C for UE 110B. As such, the BBU is informed that UE 110 A and UE 110B use different beam spaces over this RB interval. Then, the RU can send the signals of these UEs expressed in the selected beam space to the BBU.
RBs {16-40}⇒beam space {D, B, D}.
RBs {41-50}⇒beam space {A, E, D}.

The RU 210 does not need to send the referential to the BBU, but it needs to identify that different referential are used for different UEs/sub-bands, and potentially needs to send the cross-interference information as described above, for each transformation used at given frequency sub-bands. However, the cross-interference information is not required to be provided within the same sub-bands and it could be provided wideband or on different groups of RBs.

Furthermore, the selection process can be optimized by using aggregation and clustering algorithms. For example, the RU 210 can aggregate previously selected transformations for similar sub-bands. The RU 210 can select the most often selected transformation or create a subset of previously selected transformations, for the similar sub-bands. The RU 210 can select a transformation from the subset of previously selected transformations by performing the transformations from the subset and selecting the transformation that yields the most signal information in the fewest dimensions. The clustering algorithm allows the RU to approximate the selected transformation or the transformations in the subset of transformations.

In some embodiments, the RU 210 could select one referential for all the UEs while considering the effects of all the UEs together. The RU 210 could also select one referential for a subset of UEs, while considering the effects of the UEs together. This common referential can be sufficient to account for both each UE's signals in the beam space and the cross-interference between them. The subsets of UEs could be generated by using clustering algorithms, for example. The output of these algorithms could train over time a neural network to identify subsets of UEs and frequency sets.

It should be noted that the selection process can be performed several times over a period of time. Furthermore, it is also possible for the BBU 200 to request the RU 210 to use a specific transformation for a specific UE. For example, an important UE can be guarantied to use a non-compressed transformation. To do so, the BBU informs the RU to use the non-compressed transformation for this important UE.

The signal flow 300 continues with step 330. After the selected transformation is applied to the received signals, the RU 210 sends the following spatial and frequency information to the BBU 200, for each of the UEs:

Received signals per 'beam' (as expressed in the beam space given by the selected transformation), where a beam is one dimension of the selected referential/transformation. The RU 210 can decide to send all, or a subset of signals, the subset comprising the most significant power per beam, for example.

And in the possibility of MU-transmissions, a cross-interference information, which is used to inform the BBU 200 how the UEs can be matched or paired.

The cross-interference information can be signaled to the BBU 200 in different ways.

In some embodiments, an indication of the cross-interference information can be sent to the BBU 200. For example, the RU 210 can send a flag to the BBU 200. The flag is used to inform the BBU 200 that a UE 110 uses its own referential, i.e. the transformation that was selected in step 320. As such, the BBU 200 cannot determine itself the cross-interference information between signals from this UE and signals from other UEs.

In some embodiments, the indication may comprise an absence of cross-interference information, i.e. the RU 210 has not sent any cross-interference information to the BBU. In such a case, the BBU 200 assumes a cross-interference information that is very high, e.g. it is higher than a threshold, and therefore there would be no gains of pairing that UE with others. As such, the BBU may not attempt pairing of this UE.

In some embodiments, a list or sets of UEs matched on the same referential can be sent to the BBU 200. When receiving that list, the BBU 200 can use it to evaluate the cross-interference information between signals from the UEs on those sets. It is noteworthy that the BBU does not need to know which beam space is used, as long as this beam space is orthogonal. Otherwise the RU 210 should inform of the non-orthogonality of this beam-space to the BBU 200.

In some embodiments, the referential selection can be marked by a flag preceding each UE's signal, which flag represent the index number of a selected referential within the current time/frequency block.

In some embodiments, a matrix of cross-interference information between signals from the UEs and selected beams (or selected dimensions after the transformation) can be sent to the BBU 200. This matrix could be sparse by omitting data that is of little interest: e.g. cross-interference information that is comparable to background noise or inter-cell interference levels. These data are removed from the matrix. The sparse matrix could be defined by the consecutive dimensions of each UE receptively: {Beam 1 of UE1; beam 2 of UE1, . . . , beam 1 of UEx, . . . }.

It should be noted that embodiments of this disclosure allow to reduce the amount of spatial information that needs to be transmitted to the BBU 200 from the RU 210 for performing scheduling of the data transmissions to the UEs.

As mentioned above, in the current systems, one known and fixed transformation/referential is used for all the UEs and the best beam for each UE can be signaled to the BBU 200. With such information, the BBU 200 is able to determine the cross-interference information between signals from the UEs, as it knows the used transformation (which is a fixed one).

Embodiments of this disclosure allow to abstract the used transformation. By doing so, the BBU cannot determine itself the cross-interference information between signals from UEs. Therefore, the embodiments of this disclosure may cause the RU to provide the cross-interference information to the BBU 200. For example, let's consider that UE 110A has 2 antennas and 2 beams are selected, and, UE 110B has 1 antenna (or its antennas are highly correlated) and only one beam is selected; this is possible because a different transformation is used by the RU. The RU 210 then evaluates the cross-interference information of the two UEs (110A and 110B), between the three selected beams and provides only the required submatrix (rectangles with X) of beams/UEs correlation as illustrated in Table 1.

Table 1: Cross-interference (or Cross-correlation) between selected beams of different UEs.

The embodiments of the present disclosure allow to reduce the number of dimensions through the selection of a specific referential. As such, it is possible to down select the number of beams.

For instance, when considering the previous example, by using an SVD on the channel information of UE 110A and UE 110B, it could be determined that only 4 beams (or dimensions) out of 64 would carry all the signal information. As such, only those 4 beams are selected and then sent to the BBU 200. Furthermore, the cross-interference matrix sent to the BBU 200 could inform the BBU that it can evaluate pairing of those UEs (UE 110A and 110B) on the respective selected dimensions for which the cross-interference matrix is provided.

With more than 2 UEs, it becomes important for the RU to wisely select the dimensions and possibly use a common referential for at least some UEs. In this way, the amount of information regarding the number of UEs per UE combinations of cross-interference can be reduced, e.g. by only providing the signal information on the shared dimensions/beams. For example, sending cross-interference information for all combinations may represent more information than selecting a large (in number of dimensions) transformation for all UEs in a considered subset, e.g. sending 10 signals for all 10 UEs vs. sending combinations of 2 out of 10 cross-interference information.

By defining a subset of UEs that share the same (or common) referential, the RU 210 does not need to send any cross-interference information between signals from the subset of UEs to the BBU 200. As such, the amount of spatial information to be sent to the BBU may be reduced. The RU 210 could signal the BBU the subset of UEs that share the same referential. Furthermore, based on the received information of the subset of UEs that share the same referential, the BBU can determine the cross-interference information between signals from the UEs in the subset. It should be noted that, the more orthogonal the UEs are, the less important it is for the BBU 200 to know a detailed cross-interference value between the UEs. For those UEs, the RU 210 can simply send an indication to the BBU that UE 110A, UE 110B and UE 110C (for example) can be matched with high confidence or with a cross-interference inferior to a threshold (e.g. X dB).

For UEs that are very correlated, the BBU 200 does not need to know that these UEs can be matched, it will simply not receive any cross-correlation information and understand that these UEs are not to be paired.

In short, the RU 210 can preselect which UEs can be grouped together (e.g. how much orthogonal UEs can be to each other). It can then send the cross-interference information for only those UEs. At the scheduler in the BB unit, the cross-interference information will be understood as very high (e.g. higher than a threshold) if it is not received for a given set of UEs.

In step 340, the core network 130 sends data for transmission to the UE 110 to the BBU 200. The core network 130 may also send some metadata for the data transmission, such as priority and Quality of Service (Qos) information.

In step 350, the BBU 200 determines transmission scheduling for the received data, based on at least the spatial and frequency information received from the RRU 210, e.g. the spatial and frequency information comprises the UE signals expressed in the beam space. As a note, the BBU 200 does not make any assumptions on the referential that was used to generate the received spatial and frequency information. Actually, the BBU 200 does not need to know the chosen referential/transformation determined by the RU 210.

To determine the transmission scheduling, the BBU 200 can determine UE pairing and resource allocation based on the cross-interference information and signals expressed in the beam space, received from the RRU 210. The BBU 200 can further determine a modulation coding scheme (MCS) to use for the data transmission, based on the spatial and frequency information receive d from the RU 210. Then, the BBU 200 generates the modulated signals of the transmission data. The modulation of the signals is based on the determined MCS.

In step 360, the BBU 200 sends the modulated signals to the RU 210.

In step 370, upon receipt of the modulated signals, the RU 210 converts the modulated signals into signals in the antenna space. To do so, the RU 210 uses the selected transformation (or the inverse of the selected transformation) to convert the modulated signals into the antenna space.

In step 380, the RU 210 sends the signals in the antenna space to the UE 110, over the air.

In some embodiments, the spatial transformation selection may be achieved by the BBU 200 instead of the RU 210. In such cases, the RU first provides the signals for channel estimation to the BBU. The BBU determines the channel estimate based on the received signals. The BBU 200 then computes the transformation selection based on the channel estimate, and finally the BBU informs the RU of the entire characteristics of the transformation, so that the RU can apply the transformation to the downlink signals to be transmitted to each UE. With this setup, the amount of transferred information over the interface 220 is still less than the amount of information exchanged in the current systems. However, the amount of transferred information for this setup is higher than the embodiments described above where the BBU is not informed of the characteristics of the selected transformations.

Now turning to FIG. 4, a flow chart of a method 400 for transmitting spatial information of UE signals to a baseband unit, such as 200, will be described. The method can be implemented in the RU 210, for example.

Method 400 comprises the following steps:

Step 410—the RU determines a channel estimate based on signals received from a UE.

The received signals can comprise SRS and DMRS for example. Alternatively, the channel estimate can be received from the BBU or UE.

Step 420—the RU selects a spatial transformation to be applied to the received signals. The selection can be done based on the channel estimate, for example. Also, the transformation can be selected from the following transformations: Zero Forcing (setting zeros in directions of other UEs or interference from other RRUs/transmitters), FFT, SVD, DFT, shifted DFT, Grassmannian, or other over-sampled or non-orthogonal transformations, and predefined-codebooks or combinations of transformations. For example, the transformation that provides the most signal information in the fewest dimensions can be selected. The spatial transformation selection process can be further based on frequency information, time information and location information. For example, the selection can comprise selecting a transformation that is most used over a period of time, selecting a transformation that is most used over a frequency interval, or selecting a transformation that is most used when the UE is located in a specific area or at certain positions. The RU can also select different transformations for different sub-bands of the received signals. Furthermore, the RU can select a transformation based on a transformation selected for another UE. The selected transformation is different from the selected transformation for the other UE.

Step 430—the RU sends a set of signals transformed by the selected transformation to a baseband unit. For example, the RU can send all the transformed signals or only a subset of the transformed signals. The RU may further determine cross-interference information between the signals from the UE and signals from other UEs. Then, the RU sends the cross-interference information to the BBU 200. The RU can also send a flag to the BBU to let it know that the RU uses its own selected referential/transformation. As such, the BBU is informed that it cannot determine the cross-interference information for the UE. The RU can also determine a subset of UEs that can be paired for MU transmissions. Then, the RU sends an indication of the subset of UEs to be paired to the BBU. The RU can further determine cross-interference information between signals of the subset of UEs and send the cross-interference information to the BBU. The RU can further determine and select the same transformation for the subset of UEs. As such, the RU does not need to determine the cross-interference information. But the BBU can determine the cross-interference information knowing that the subset of UEs have the same referential. In case of a transformation selected for a frequency interval, the RU can also send an indication to the BBU for indicating that the selected transformation is for the frequency interval.

It should be noted that, in all cases, the RU refrains from sending an indication of the selected transformation to the BBU.

Figure 5:
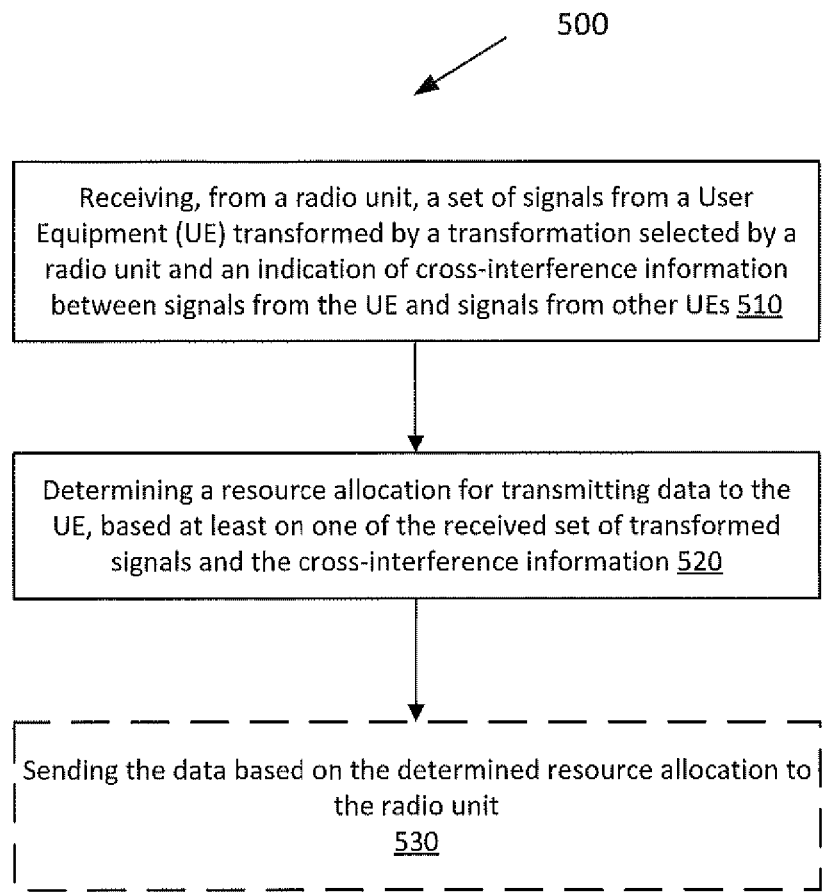
FIG. 5 illustrates a flow chart of a method in a baseband unit, according to an embodiment.

FIG. 5 illustrates a flow chart of a method 500 for determining scheduling of a data transmission. The method can be implemented in the BBU 200, for example.

Method 500 comprises the following steps:

Step 510—the BBU 200 receives, from a radio unit, a set of signals from a User Equipment (UE) transformed by a transformation selected by a radio unit (RU), and an indication of cross-interference information between signals from the UE and signals from other UEs. For example, the indication of the cross-interference information may comprise a flag, which indicates that the RU uses a selected referential unknown to the baseband unit. In response to the receipt of the flag, the BBU refrains from determining the cross-interference information for the UE. The BBU can receive the cross-interference information from the RU as well. The indication may comprise an absence of cross-interference information. In this case, the BBU may assume or determine that the cross-interference information is higher than a threshold. Alternatively, the BBU may assume or determine that the cross-interference information is lower than a threshold. The indication may further comprise a subset of UEs that can be paired for MU transmissions. The BBU can further receive an indication that the subset of UEs use the same transformation/referential. As such, the BBU can determine the cross-interference information between the signals from the subset of UEs.

Step 520—the BBU 200 determines a resource allocation for transmitting data to the UE based at least on one of the received set of transformed signals and the cross-interference information. For example, the BBU may pair different UEs for MU transmissions based on the indication of the subset of UEs to be paired. The BBU can also determine a modulation and coding scheme (MC S) for the data transmission.

Optional Step 530—the BBU 200 sends the data based on the determined resource allocation to the radio unit. For example, the BBU can generate some modulated signals using the determined MCS and then send the modulated signals to the RU.

It should be noted that embodiments of the present disclosure provide a protocol for coordinating the exchange of spatial and frequency information of signals from the UE.

Embodiments of a radio unit 210 will now be described with respect to FIGS. 6 and 7.

Figure 6:
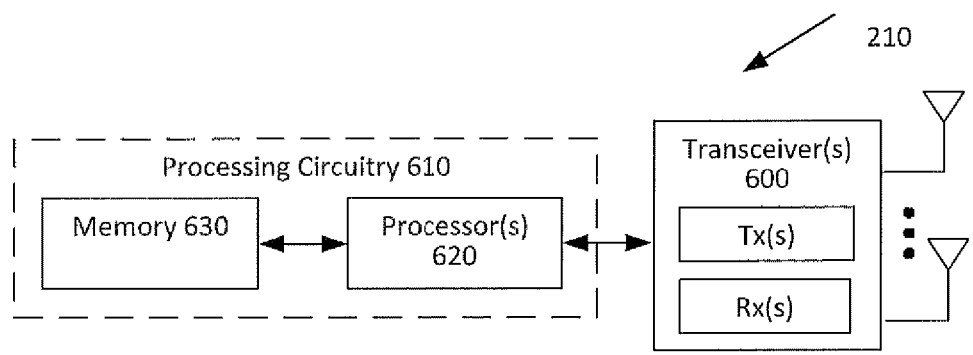
FIG. 6 illustrates a schematic diagram of a radio unit according to an embodiment.
Figure 7:
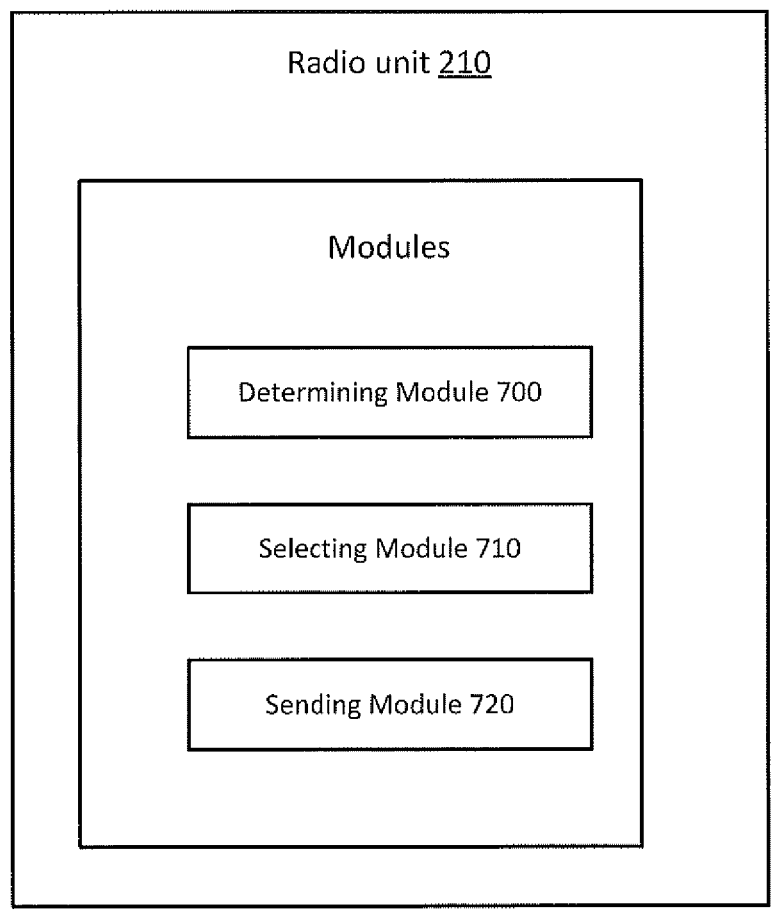
FIG. 7 illustrates a schematic diagram of a radio unit according to another embodiment.

FIG. 6 is a block diagram of an exemplary radio unit 210, in accordance with certain embodiments. Radio unit 210 may include one or more of a transceiver 600 and processing circuitry 610. In some embodiments, the transceiver 600 facilitates transmitting wireless signals to and receiving wireless signals from wireless device 110 (e.g., via transmitter(s) (Tx), receiver(s) (Rx), and antenna(s)). The processing circuitry 610 may comprise one or more processors 620 and a memory 630, connected the processor 610. The processor 610 executes instructions to provide some or all of the functionalities described above as being provided by a radio unit 210 (e.g. method 400 of FIG. 4). The memory 630 stores the instructions executed by the processor.

The processor 620 may include any suitable combination of hardware to execute instructions and manipulate data to perform some or all of the described functions of the radio unit 210, such as those described above. In some embodiments, the processor 610 may include, for example, one or more computers, one or more central processing units (CPUs), one or more microprocessors, one or more application specific integrated circuits (ASICs), one or more field programmable gate arrays (FPGAs) and/or other logic.

The memory 620 is generally operable to store instructions, such as a computer program, software, an application including one or more of logic, rules, algorithms, code, tables, etc. and/or other instructions capable of being executed by a processor. Examples of memory include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

Other embodiments of the radio unit 210 may include additional components beyond those shown in FIG. 6 that may be responsible for providing certain aspects of the radio unit's functionalities, including any of the functionalities described above and/or any additional functionalities (including any functionality necessary to support the solutions described above). The various different types of network nodes may include components having the same physical hardware but configured (e.g., via programming) to support different radio access technologies, or may represent partly or entirely different physical components.

In some embodiments, the radio unit 210 may comprise a series of modules configured to implement the functionalities of the radio unit 210 described above. Referring to FIG. 7, in some embodiments, the radio unit 210 may comprise a determining module 700, a selecting module 710 and a sending module 720.

Figure 4:
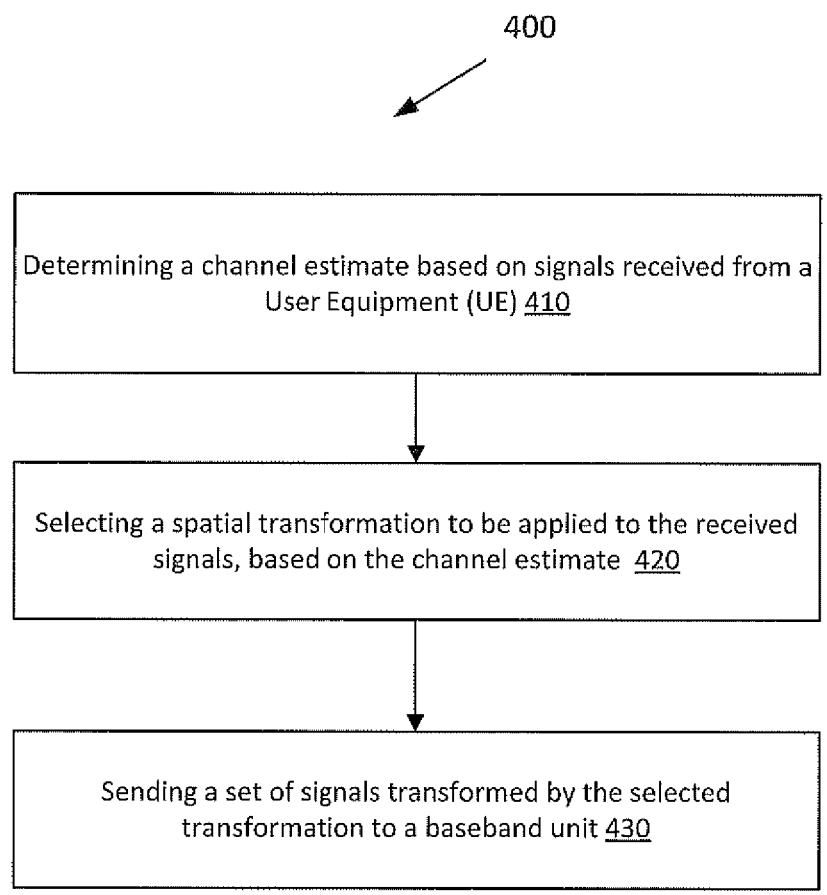
FIG. 4 illustrates a flow chart of a method in a radio unit, according to an embodiment.

The determining module 700 is configured to determine a channel estimate based on signals received from a UE, such as step 410 of method 400 of FIG. 4.

The selecting module 710 is configured to select a spatial transformation to be applied to the received signals, based on the channel estimate, such as step 420 of method 400 in FIG. 4.

The sending module 720 is configured to send a set of signals transformed by the selected transformation to a baseband unit, such as step 430 of method 400 in FIG. 4.

It will be appreciated that the various modules may be implemented as combination of hardware and/or software, for instance, the processor, memory and transceiver(s) of radio unit 210 shown in FIG. 6. Some embodiments may also include additional modules to support additional and/or optional functionalities.

Embodiments of a baseband unit such as 200 will now be described with respect to FIGS. 8 to 9.

Figure 8:
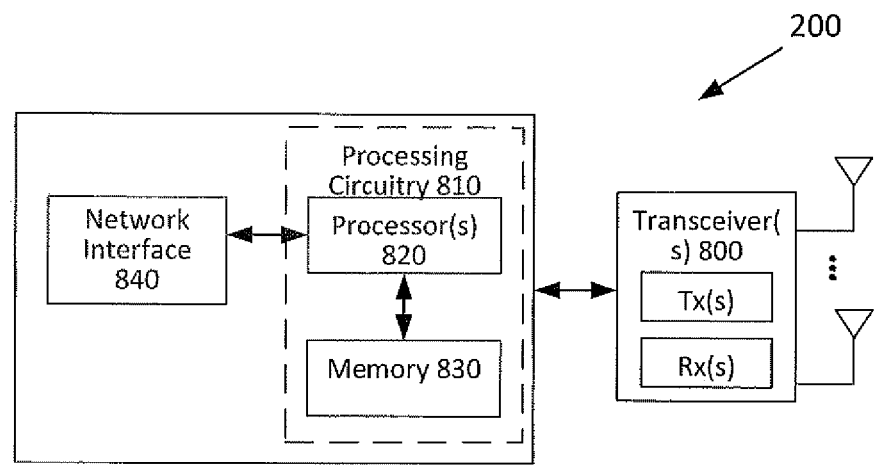
FIG. 8 illustrates a schematic diagram of a baseband unit according to an embodiment.
Figure 9:
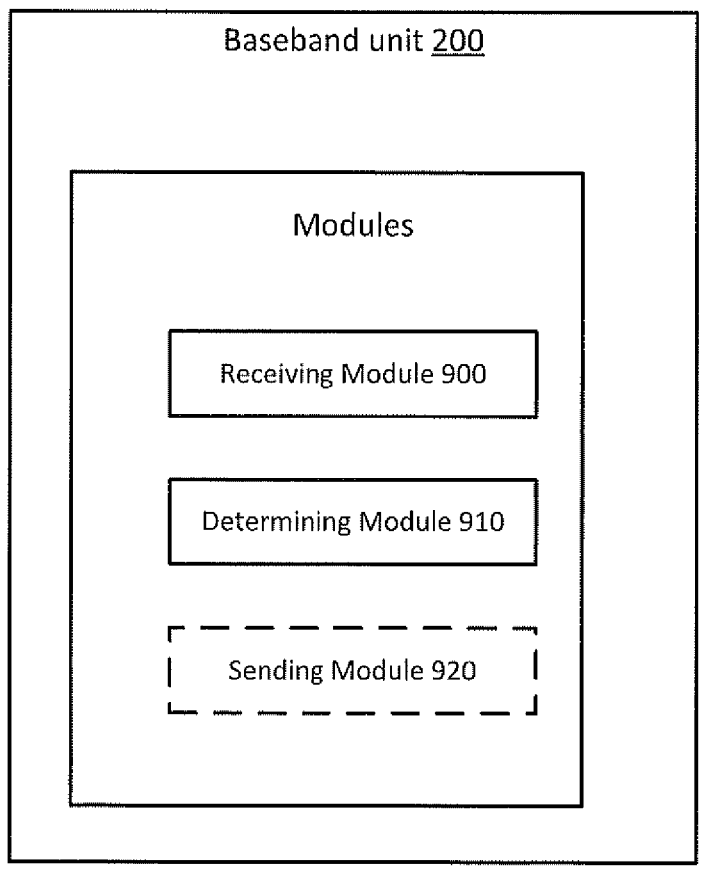
FIG. 9 illustrates a schematic diagram of a baseband unit according to another embodiment.

FIG. 8 is a block diagram of an exemplary BBU 200, in accordance with certain embodiments. BBU 200 may include one or more of a transceiver 800, a processing circuitry 810 and network interface 840. In some embodiments, the transceiver 800 facilitates transmitting wireless signals to and receiving wireless signals from a radio unit 210 (e.g., via transmitter(s) (Tx), receiver(s) (Rx), and antenna(s)). The processor 820 executes instructions to provide some or all of the functionalities described above as being provided by a BBU 200, such as method 500 of FIG. 5, the memory 830 stores the instructions executed by the processor 820. In some embodiments, the processor 820 and the memory 830 form the processing circuitry 810. The network interface 840 communicates signals to backend network components, such as a gateway, switch, router, Internet, Public Switched Telephone Network (PSTN), core network nodes or radio network controllers, etc.

The processor 820 may include any suitable combination of hardware to execute instructions and manipulate data to perform some or all of the described functions of the BBU 200, such as those described above. In some embodiments, the processor 820 may include, for example, one or more computers, one or more central processing units (CPUs), one or more microprocessors, one or more application specific integrated circuits (ASICs), one or more field programmable gate arrays (FPGAs) and/or other logic.

The memory 830 is generally operable to store instructions, such as a computer program, software, an application including one or more of logic, rules, algorithms, code, tables, etc. and/or other instructions capable of being executed by a processor 820. Examples of memory include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, the network interface 840 is communicatively coupled to the processor 820 and may refer to any suitable device operable to receive input for the BBU 200, send output from the BBU 200, perform suitable processing of the input or output or both, communicate to other devices, or any combination of the preceding. The network interface 840 may include appropriate hardware (e.g., port, modem, network interface card, etc.) and software, including protocol conversion and data processing capabilities, to communicate through a network.

Other embodiments of the BBU 200 may include additional components beyond those shown in FIG. 8 that may be responsible for providing certain aspects of the BBU's functionalities, including any of the functionalities described above and/or any additional functionalities (including any functionality necessary to support the solutions described above). The various different types of network nodes may include components having the same physical hardware but configured (e.g., via programming) to support different radio access technologies, or may represent partly or entirely different physical components.

In some embodiments, the BBU may comprise a series of modules configured to implement the functionalities of the BBU described above. Referring to FIG. 9, in some embodiments, the BBU 200 may comprise a receiving module 900, a determining module 910, and optionally a sending module 920.

The receiving module 900 is configured to receive a set of signals from a UE transformed by a transformation selected by a radio unit, and an indication of cross-interference between signals from the UE and signals from other UEs, such as step 510 of method 500 in FIG. 5.

The determining module 910 is configured to determine a resource allocation for transmitting data to the UE based at least on one of the set of transformed signals and the cross-interference information, such as step 520 of method 500 in FIG. 5.

The sending module 530 is configured to send the data based on the determined resource allocation to the radio unit, such as step 530 of method 500 in FIG. 5.

It will be appreciated that the various modules may be implemented as combination of hardware and/or software, for instance, the processor 820, memory 830 and transceiver(s) 800 of the BBU 200 shown in FIG. 8 respectively. Some embodiments may also include additional modules to support additional and/or optional functionalities.

Some embodiments may be represented as a non-transitory software product stored in a machine-readable medium (also referred to as a computer-readable medium, a processor-readable medium, or a computer usable medium having a computer readable program code embodied therein). The machine-readable medium may be any suitable tangible medium including a magnetic, optical, or electrical storage medium including a diskette, compact disk read only memory (CD-ROM), digital versatile disc read only memory (DVD-ROM) memory device (volatile or non-volatile), or similar storage mechanism. The machine-readable medium may contain various sets of instructions, code sequences, configuration information, or other data, which, when executed, cause a processor to perform steps in a method according to one or more of the described embodiments. Those of ordinary skill in the art will appreciate that other instructions and operations necessary to implement the described embodiments may also be stored on the machine-readable medium. Software running from the machine-readable medium may interface with circuitry to perform the described tasks.

The above-described embodiments are intended to be examples only. Alterations, modifications and variations may be effected to the particular embodiments by those of skill in the art without departing from the scope of the description, which is defined solely by the appended claims.

Abbreviations

The present description may comprise one or more of the following abbreviation:
SCG subcarrier group, or sets of RB
RB resource blocks
RU radio unit
BBU baseband unit
DFT discrete Fourier transform
SVD singular value decomposition

What is claimed is:

1. A method in a radio unit, the method comprising:
determining a channel estimate based on signals received from a User Equipment (UE) and determining a rank of a matrix of a channel;
selecting a spatial transformation to be applied to the received signals, based on the channel estimate; and
sending a set of signals transformed by the selected transformation to a baseband unit.

2. A radio unit comprising a network interface and processing circuitry connected thereto, the processing circuitry comprising a processor and a memory connected thereto, the memory containing instructions that, when executed, cause the processor to:
determine a channel estimate based on signals received from a User Equipment (UE) and determine a rank of a matrix of a channel;
select a spatial transformation to be applied to the received signals, based on the channel estimate; and
send a set of signals transformed by the selected transformation to a baseband unit.

3. The radio unit of claim 2, wherein the processor is configured to:
perform at least one of the following spatial transformations on the received signals: Discrete Fourier Transform (DFT), shifted DFT, Grassmannian transform, oversampled transform, non-orthogonal transform, Zero Forcing (ZF), Fast Fourier Transform (FFT), and Singular Value Decomposition (SVD); and
select a transformation that provides most signal information in fewest dimensions.

4. The radio unit of claim 2, wherein the processor is configured to select a transformation that is most used over a period of time.

5. The radio unit of claim 2, wherein the processor is configured to select different spatial transformations for different sub-bands.

6. The radio unit of claim 2, wherein the processor is configured to select a transformation that is most used over a frequency interval.

7. The radio unit of claim 6, wherein the processor is configured to send an indication to the baseband unit, the indication for indicating that the selected transformation is for the frequency interval.

8. The radio unit of claim 2, wherein the processor is configured to select a transformation that is most used when the UE is located in a specific area.

9. The radio unit of claim 2, wherein the processor is configured to send an indication of cross-interference information between signals from the UE and signals from other UEs to the baseband unit.

10. The radio unit of claim 9, wherein the processor is configured to determine the cross-interference information between the signals from the UE and the signals from the other UEs and send the cross-interference information to the baseband unit.

11. The radio unit of claim 2, wherein the processor is configured to send a flag which indicates to the baseband unit that the radio unit uses a selected spatial transformation.

12. The radio unit of claim 11, wherein the flag further informs the baseband unit to refrain from calculating the cross-interference information for the UE.

13. The radio unit of claim 2, wherein the processor is configured to receive signals from a plurality of UEs and determine a subset of UEs among the plurality of UEs that can be paired for Multi-User transmissions, based on the received signals.

14. The radio unit of claim 13, wherein the processor is configured to determine cross-interference information between signals from the subset of UEs and send the cross-interference information to the baseband unit.

15. The radio unit of claim 13, wherein the processor is configured to select a same spatial transformation for the determined subset of UEs that can be paired.

16. The radio unit of claim 15, wherein the processor is configured to send an indication of the determined subset of UEs that can be paired to the baseband unit.

17. The radio unit of claim 2, wherein the processor is configured to select the spatial transformation based on a transformation selected for another UE, the selected transformation being different from the transformation selected for the other UE.

18. The radio unit of claim 2, wherein the processor is configured to suppress sending an indication of the selected transformation to the baseband unit.

19. A baseband unit comprising a network interface and processing circuitry connected thereto, the processing circuitry operable to:
receive, from a radio unit, a set of signals from a User Equipment (UE) transformed by a transformation selected by a radio unit, and an indication of cross-interference information between signals from the UE and signals from other UEs; and
determine a resource allocation for transmitting data to the UE, based at least on one of the received set of transformed signals, and the cross-interference information.

* * * * *